(12) United States Patent
Schwalm et al.

(10) Patent No.: US 7,300,494 B2
(45) Date of Patent: Nov. 27, 2007

(54) ON-BOARD INERT GAS GENERATION SYSTEM WITH COMPRESSOR SURGE PROTECTION

(75) Inventors: Gregory Schwalm, Canton, CT (US); Eric Surawski, Wethersfield, CT (US); John Schwemmer, Ellington, CT (US); Mark Dion, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 514 days.

(21) Appl. No.: 11/064,587

(22) Filed: Feb. 24, 2005

(65) Prior Publication Data

US 2006/0185514 A1  Aug. 24, 2006

(51) Int. Cl.
*B01D 53/22* (2006.01)

(52) U.S. Cl. ............................ 95/54; 96/4; 244/135 R

(58) Field of Classification Search .................... 95/54, 95/138; 96/4, 108; 244/135 R
See application file for complete search history.

(56) References Cited

U.S. PATENT DOCUMENTS

| 6,729,359 | B2 | 5/2004 | Jones |
| 6,739,359 | B2 | 5/2004 | Jones et al. |
| 6,913,636 | B2 * | 7/2005 | Defrancesco et al. ............. 95/8 |
| 7,081,153 | B2 * | 7/2006 | Leigh et al. .................... 95/14 |
| 7,175,692 | B2 * | 2/2007 | Schwalm ........................ 95/22 |

OTHER PUBLICATIONS

U.S. Patent Application: "On-Board Inert Gas Generation System", U.S. Appl. No. 11/006,966, filed Dec. 8, 2004.

* cited by examiner

*Primary Examiner*—Robert A. Hopkins
(74) *Attorney, Agent, or Firm*—Carlson, Gaskey & Olds

(57) ABSTRACT

A valve assembly includes a nitrogen enriched airflow control valve, a first stage surge control valve and a second stage surge control valve respectively arranged in a passage downstream of an air separation module, and in first and second surge control passages. The valves are in a ganged relationship or connected to one another such they move with one another in response to an input from a common actuator. The surge control valves open as the nitrogen enriched airflow control valve is moved to provide a smaller area.

14 Claims, 2 Drawing Sheets

US 7,300,494 B2

ON-BOARD INERT GAS GENERATION SYSTEM WITH COMPRESSOR SURGE PROTECTION

BACKGROUND OF THE INVENTION

This invention relates to an on-board inert gas generation system. Specifically, the invention relates to a method and apparatus for increasing the pressurized air provided to an air separation module of the system.

On-board inert gas generation systems are increasingly used in aircraft to provide inert gas to various locations such as the cargo area or fuel tanks. Typically, the system includes two compressors or stages arranged in series for providing compressed air to the air separation module. It is desirable to provide high pressures to the air separation module to reduce the weight of the module. Lowering the inlet pressure to the module greatly increases its weight.

Centrifugal compressors are typically used in the system to provide compressed air to the module. It is desirable to ensure that the compressors do not operate in a surge condition, which is a transient phenomenon that occurs when flow through the compressors is reduced below the designed flow rate. Surge can damage or destroy a compressor. Surge can be difficult to avoid since on-board inert gas generation systems typically operate under a wide range of flow rates.

One prior art system includes a nitrogen enriched airflow valve arranged downstream of the air separation module. The nitrogen enriched airflow valve operates by either modulating between a small area position and a range of large area positions or by switching between a large and a small area position to vary the flow through the valve. Prior art systems have also included a surge control valve downstream of the first compressor to selectively vent the compressed air overboard. The surge control valve moves between open and closed positions to increase the flow through the first compressor to keep the compressor from going into a surge condition when the nitrogen enriched airflow valve closes to a smaller area restricting flow through the system.

The nitrogen enriched airflow valve and surge control valve employed separate actuators. If the surge control valve fails when the nitrogen enriched valve is in a small area position then a surge condition will result in the first compressor leading to a mechanical failure of the compressor.

What is needed is a simplified surge protection system that is more reliable in the event of a surge control valve failure.

SUMMARY OF THE INVENTION

An on-board inert gas generation system of one example of the present invention provides first and second compressors in fluid communication with one another. A heat exchanger is fluidly connected between the first and second compressors. The heat exchanger is arranged in a ram air duct. A first surge control passage is arranged downstream of an outlet of the first compressor. The first surge control passage exits to the ram air duct. A second surge control passage is arranged downstream of an outlet of the second compressor before an air separation module. The second surge control passage vents to the ram air duct. A nitrogen enriched airflow valve is arranged downstream of the air separation module.

A valve assembly includes a nitrogen enriched airflow control valve, and first and second stage surge control valves respectively arranged in a passage downstream of the air separation module, and in the first and second surge control passages. The valves are in a ganged relationship or connected to one another such they move with one another in response to an input from a common actuator. The surge control valves open as the nitrogen enriched airflow control valve is moved to provide a smaller area.

In this manner, the system is simplified by eliminating an actuator and providing increased reliability to the system in the event of a failure of the actuator.

These and other features of the present invention can be best understood from the following specification and drawings, the following of which is a brief description.

DETAILED DESCRIPTION OF THE PREFERRED EMBODIMENT

Figure 1:
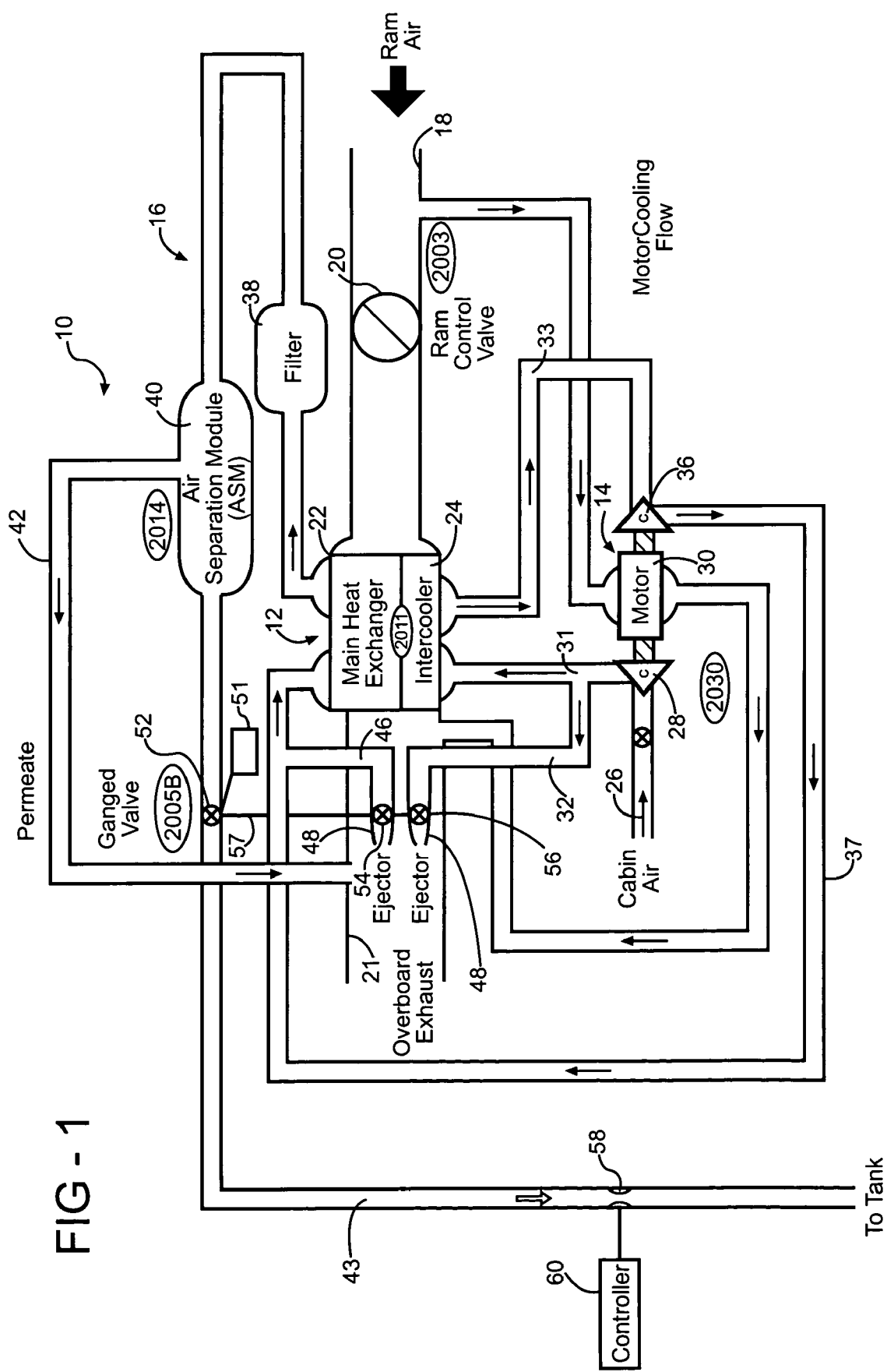
FIG. 1 is a schematic illustration of one example of the inventive on-board inert gas generation system.

FIG. 1 is a highly schematic depiction of one example of an inventive on-board inert gas generation system 10. The system 10 includes a heat exchanger system 12 that removes heat generated by compressed air from a compressor system 14. The compressed air provides pressurized air to an air separation module system 16.

The heat exchanger system 12 is arranged between a ram air inlet duct 18 and a ram air outlet duct 21. Flow through the ram air ducts 18 and 21 is regulated by a control valve 20 arranged between the ram air inlet duct 18 and the heat exchanger system 12.

Air 26 enters the system 10, for example from the cabin, into a first compressor 28 of the compressor system 14. The first compressor 28 is driven by an electric motor 30. The compressed air exits the first compressor 28 and flows through a passageway 31 through an intercooler 24 of the heat exchanger system 12 where the ram air removes the heat from the compressed air.

Cooled air from the intercooler 24 flows through the passageway 33 to an inlet of a second compressor 36. The second compressor 36 is also driven by the electric motor 30. Compressed air exits an outlet of the second compressor 36 and flows through a passageway 37 to a main heat exchanger 22 of the heat exchanger system 12. Air flowing through the main heat exchanger 22 is cooled by the ram air before flowing to a passageway 39. A filter 38 is arranged within the passageway 39. The filtered air enters an air separation module 40 of the air separation system 16 at an inlet. The air separation module 40 produces inert gas such as nitrogen for aircraft locations such as the fuel tank and cargo area. Permeate produced by the air separation module 40 flows through a permeate passage 42 to the ram air outlet duct 21.

A first surge control passage 32 is arranged between the passageway 31 and the ram air outlet duct 21. A second surge control passage 46 is arranged between the passageway 37 and the ram air outlet duct 21. The first and second surge control passages 32 and 46 respectively include first and second stage surge control valves 54 and 56. The surge control valves 54 and 56 selectively regulate flow through their respective passages 32 and 46. Specifically, when the flow through the compressors 28 and 36 is reduced below the designed flow, a surge may result that can damage or destroy the compressors 28 and 36. Normally, the surge control valves 54 and 56 are closed, but the surge control valves 54 and 56 are opened to vent flow to the ram air outlet duct 21 thereby stabilizing the compressors 28 and 36.

A nitrogen enriched airflow control valve 52 is arranged in a passageway 43 downstream from the air separation module 40. The nitrogen enriched airflow control valve 52 and first and second stage surge control valves 54 and 56 form a valve assembly 50 that is moveable in response to an input from an actuator 51. For example, the valves 52, 54, and 56 are "ganged" together and may be mounted on a common shaft 57 for motion together with one another in response to the input from the actuator 51. In this manner, a single actuator 51 may be used to actuate all the valves 52, 54, and 56 thereby simplifying the system 10.

Figure 2:
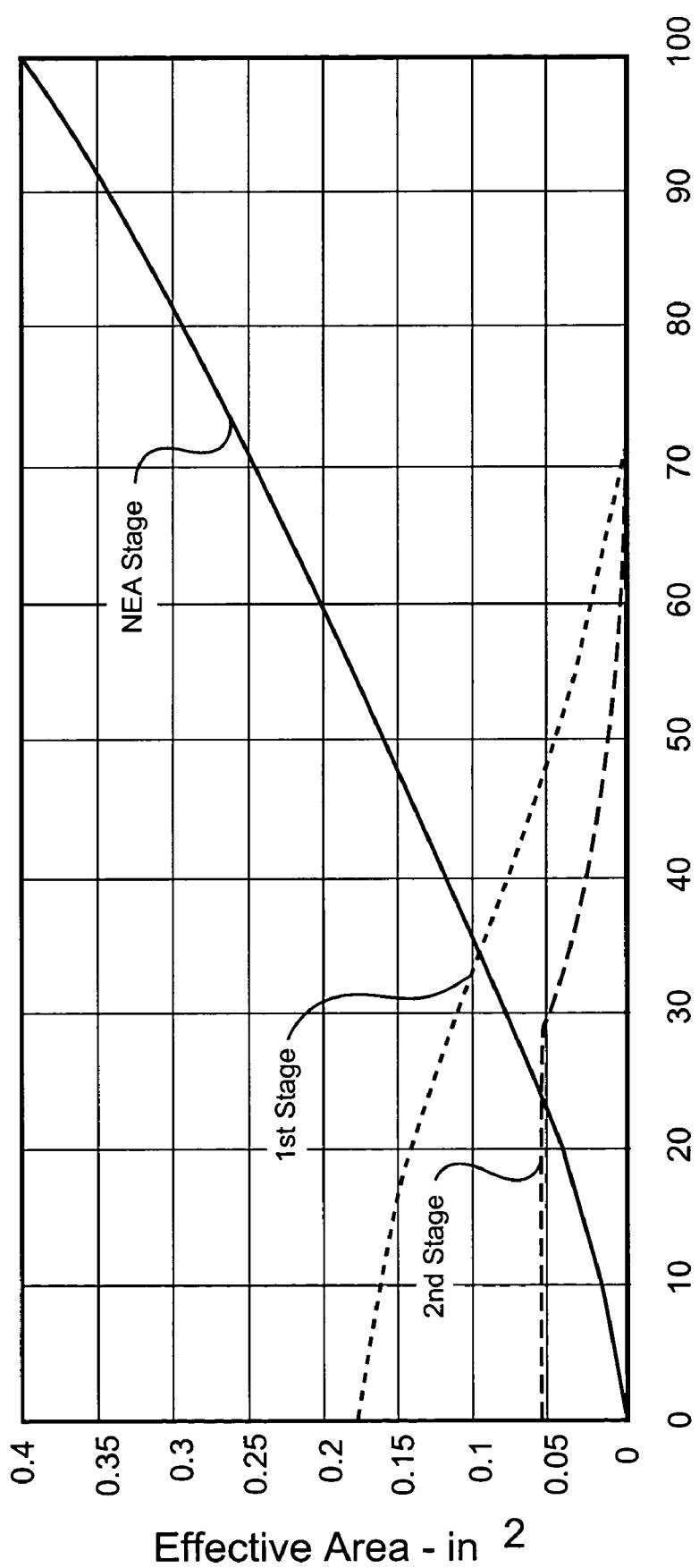
FIG. 2 is a graphical depiction of the effective open area versus percentage actuator stroke of the nitrogen enriched airflow valve and first and second stage surge valves.

Referring now to FIG. 2, the valves 52, 54, and 56 are arranged relative to one another so that as the nitrogen enriched airflow control valve 52 moves to a closed position, the surge control valves 54 and 56 move to an open position. As a result, as the nitrogen enriched airflow control valve 52 is moved toward a closed position thereby restricting the airflow from the system 10, compressed air from the outlet of the first and second compressors 28 and 36 is vented to atmosphere to reduce the back pressure on the compressors 28 and 36 so that flow is increased through the compressors 28 and 36 preventing a surge condition.

The inventive system has improved reliability in the event of an actuator failure. Specifically, the surge control valves 54 and 56 cannot fail in a closed position without the nitrogen enriched airflow control valve 52 failing in an open position which is an inherently more stable condition with respect to potential surge. To detect a failed condition of the valve assembly 50, a flow sensor 58 may be arranged downstream of the nitrogen enriched airflow valve 52. A controller 60 is connected to the flow sensor 58. The controller 60 may be connected to the actuator 51 and/or a position sensor (connections not shown for clarity). If a high nitrogen enriched airflow is detected by the flow sensor 58 with respect to a desired valve assembly position, the controller 60 can shut the system down to prevent damage to the compressors 28 and 36.

The first and second surge control passages 32 and 46 may include ejectors 48 at their exit within the ram air outlet duct 21. The ejectors 48 create a low pressure area at the exit side of the heat exchanger system 12 thereby increasing flow through the heat exchanger system 12.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An on-board inert gas generation system comprising:
   first and second compressors in fluid communication with one another;
   an air separation module with a passageway fluidly connecting the air separation module with the second compressor, the second compressor fluidly arranged between the air separation module and the first compressor; and
   first and second surge control passages respectively in fluid communication with outlets of the first and second compressors, the surge control passages venting to atmosphere in response to first and second stage surge control valves respectively arranged within the first and second surge control passages moving to an open position.

2. The system according to claim 1, wherein the surge control valves are connected to one another, a common actuator moving the surge control valves from a closed position to the open position.

3. The system according to claim 2, wherein a nitrogen enriched airflow control valve is arranged downstream of the air separation module, the nitrogen enriched airflow control valve connected to the surge control valves, the common actuator moving the valves together.

4. The system according to claim 3, wherein the nitrogen enriched airflow control valve movable between small and large area positions, the actuator moving the nitrogen enriched airflow control valve from the large area position to the small area position as the surge control valves move from the closed position to the open position.

5. The system according to claim 1, wherein the surge control passages exit to a ram air duct.

6. The system according to claim 5, wherein the surge control passages include ejectors arranged in the ram air duct on an outlet side of the ram air duct, the ejectors creating a low pressure area increasing flow through a heat exchange arranged within the air duct.

7. The system according to claim 1, wherein the first and second surge control passages fluidly connect outlets of the first and second compressors respectively to the ram air duct.

8. The system according to claim 1, wherein an electric motor drives the first and second compressors.

9. An on-board inert gas generation system comprising:
   first and second compressors in fluid communication with one another;
   an air separation module with a passageway fluidly connecting the air separation module with the second compressor, the second compressor fluidly arranged between the air separation module and the first compressor;
   a surge control passage in fluid communication with an outlet of one of the compressors, the surge control passage venting to atmosphere in response to a surge control valve respectively arranged within the surge control passages moving to an open position; and
   a nitrogen enriched airflow control valve arranged downstream of the air separation module, the nitrogen enriched airflow control valve connected to the surge control valve and moving from a large area position to a small area position when the surge control valve moves to the open position.

10. The system according to claim 9, wherein the surge control valve and nitrogen enriched airflow valve are moved by a common actuator.

11. A method of operating an on-board inert gas generation system comprising the steps of:
   a) compressing fluid in a compressor of the system;
   b) providing the compressed fluid to an air separation module;
   c) providing a nitrogen enriched airflow valve and a compressor stage surge control valve respectively downstream of the air separation module and the compressor; and
   d) simultaneously actuating the valves.

12. The method according to claim 11, wherein step d) includes opening one valve as the other valve closes.

13. The method according to claim 11, wherein step d) includes manipulating a single actuator common to the valves.

14. The method according to claim 11, wherein the surge control valve vents to atmosphere.

* * * * *